(12) United States Patent
Morrison et al.

(10) Patent No.: US 6,876,202 B2
(45) Date of Patent: Apr. 5, 2005

(54) SYSTEM, METHOD AND COMPUTER PRODUCT GEOLOGICAL SURVEYING UTILIZING NATURAL ELECTROMAGNETIC FIELDS

(76) Inventors: Edward Beverly Morrison, 626 Foxcroft Boulevard, Newmarket, Ontario (CA), L3X 1N4; Petr Valentinovich Kuzmin, 62 Millcliff Circle, Aurora, Ontario (CA), L4G 1N4

( * ) Notice: Subject to any disclaimer, the term of this patent is extended or adjusted under 35 U.S.C. 154(b) by 58 days.

(21) Appl. No.: 10/298,544

(22) Filed: Nov. 19, 2002

(65) Prior Publication Data

US 2003/0094952 A1 May 22, 2003

Related U.S. Application Data

(60) Provisional application No. 60/331,544, filed on Nov. 19, 2001.

(51) Int. Cl.[7] .............................. G01V 3/16; G01V 3/08
(52) U.S. Cl. ....................................... 324/330; 324/331
(58) Field of Search ................................. 324/330–331; 702/14–15

(56) References Cited

U.S. PATENT DOCUMENTS

| | | | | |
|---|---|---|---|---|
| 2,931,973 A | * | 4/1960 | Puranen ...................... 324/334 |
| 3,728,612 A | * | 4/1973 | Hearn et al. ................ 324/301 |
| 3,950,695 A | * | 4/1976 | Barringer .................... 324/334 |
| 4,628,266 A | * | 12/1986 | Dzwinel .................... 324/330 |
| 5,610,523 A | * | 3/1997 | Elliot ......................... 324/330 |
| 6,414,492 B1 | * | 7/2002 | Meyer et al. .............. 324/344 |

* cited by examiner

*Primary Examiner*—N. Le
*Assistant Examiner*—Reena Aurora
(74) *Attorney, Agent, or Firm*—Eugene J.A. Gierczak; Miller Thomson LLP (57) ABSTRACT

A system, computer product and method for generating geophysical data is provided. At least one airborne sensor unit is provided which measures low frequency natural electromagnetic fields. Geophysical data is extrapolated from the tilt angles of the electromagnetic field by a computer running a data processing application. The system further includes a spatial attitude detection facility. The data processing application filters out distortions to the tilt angles caused by movement of the airborne sensor unit. The system further includes facilities for filtering out electronic noise.

17 Claims, 9 Drawing Sheets

SYSTEM, METHOD AND COMPUTER PRODUCT GEOLOGICAL SURVEYING UTILIZING NATURAL ELECTROMAGNETIC FIELDS

This application is claiming priority to U.S. application Ser. No. 60/331,544 filed on Nov. 19, 2001.

FIELD OF THE INVENTION

This invention relates in general to the field of airborne, ground, or marine geological mapping. This invention further relates to an apparatus for conducting geological surveying utilizing natural electromagnetic fields. This invention further relates to a system, computer product and method for extrapolating geological survey data from natural electromagnetic field data.

BACKGROUND OF THE INVENTION

Natural electromagnetic fields are electromagnetic fields originating mainly from lightning discharges in the Earth-ionosphere cavity. At some distance from their source, these fields propagate as a plane wave with respect to the horizontally directed vector of the magnetic field. There are two components of the field each having different properties.

The first component of natural electromagnetic fields is caused by global thunder activity. The signal produced by electromagnetic fields of this source are relatively stable. A record of this signal received in a manner that is known using a coil as a sensor appears to be random noise. It has almost a homogeneous spectral density in the range between 8 and 500 Hz. Horizontal components of this signal have spectral density of 0.05–0.15 nV/(Hz$^{1/2}$×m$^2$). The signal can change gradually several times a day depending on such factors as time of day, time of year and geographical location depending on changes in the conditions of the conductive layers in the ionosphere. Generally the worst time for measurements is winter midday because of the relatively low ambient electromagnetic fields.

The second component of natural electromagnetic fields is caused by local thunderstorms generally happening within a radius 700–1000 km. This signal is more intermittent and appears on a known sensor as separate pulses of oscillations of 1–5 ms each. The spectrum of the field is most intensive in the 2000 to 20000 Hz range. Its intensity can change significantly in a matter of hours.

The natural electromagnetic field penetrates through the ground to certain depth h which depends on the electric resistivity of the ground Ro and frequency of the field f. In the presence of a homogeneous non-magnetic conductive halfspace, the depth of field penetration h is determined in accordance with the following approximate formula:

$h=356(Ro/f)^{1/2}$ [m].

So, if we assume Ro=500 Ohm*m, f=500 Hz, then depth of field penetration h will be equal to approximately 356 meters.

Prior art solutions have been devised to extrapolate geological survey data from data collected regarding natural electromagnetic fields. For example, U.S. Pat. No. 3,149,278 ('278) issued to McPhar Geophysics Limited, invented by W. O. Cartier et al. The referenced prior art solution was based on measuring the tilt angles of the magnetic field using two or three electromagnetic coil systems mounted inside a bird towed behind an aircraft.

As, discussed in U.S. Pat. No. '278 naturally occurring electromagnetic fields exist having electric and magnetic field components in the audio frequency range. The prior art solutions discussed could only be used at defined times of the year (usually summer where there is a greater incidence of thunderstorm activity) because the prior solution could not function in low ambient electromagnetic fields. Other errors can be caused by instability of the airborne electromagnetic coil assembly in horizontal attitude during flight that causes angular rotations thereof producing errors in measuring the tilt angles. Furthermore, a geographical relief also distorts horizontal magnetic fields and produces false anomalies of tilt angles even if there are very homogeneous rocks beneath the Earth surface.

Furthermore, the prior art solutions do not permit deriving survey data from electromagnetic field measurements in relation to relatively low ambient electromagnetic fields, including in low ambient electromagnetic fields in the order of 0.05–0.15 nV/(Hz$^{1/2}$×m$^2$). This is particularly the case because having regard to such low ambient electromagnetic fields prior art solutions were unable to differentiate electromagnetic field measurements from noise.

There are a number of sources of noise that it is preferable to discount from electromagnetic field measurements to provide useful survey data.

The first source of noise is microphonic noise caused by the mechanical vibration of a sensor in the magnetic field of the Earth. In the case of the use of airborne electromagnetic sensors the mechanical vibrations of engines and/or propellers, as well as air turbulence causes this sensor vibration.

In addition, the aircraft electrical equipment and moving magnetic parts produces further electromagnetic noise.

In addition there is an internal thermal noise from sensors and input circuitry.

All of the above factors have a distorting effect on survey data extrapolated from measurement of natural electromagnetic fields. The above factors are collectively referred to in this disclosure as "Distorting Factors".

There is a need therefore for an apparatus for measuring natural electromagnetic field data that reduces the impact of such Distorting Factors. There is a further need for a system, computer product and method for extrapolating geological mapping data from natural electromagnetic field data in an efficient and cost effective manner.

BRIEF DESCRIPTION OF THE DRAWINGS

A detailed description of various embodiments are provided herein below by way of example only and with reference to the following drawings, in which.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE EMBODIMENTS OF THE PRESENT INVENTION

The present invention is capable of measuring and analyzing not only electromagnetic fields generated by thunderstorm activity, but also lower frequency global electromagnetic fields.

Figure 3:
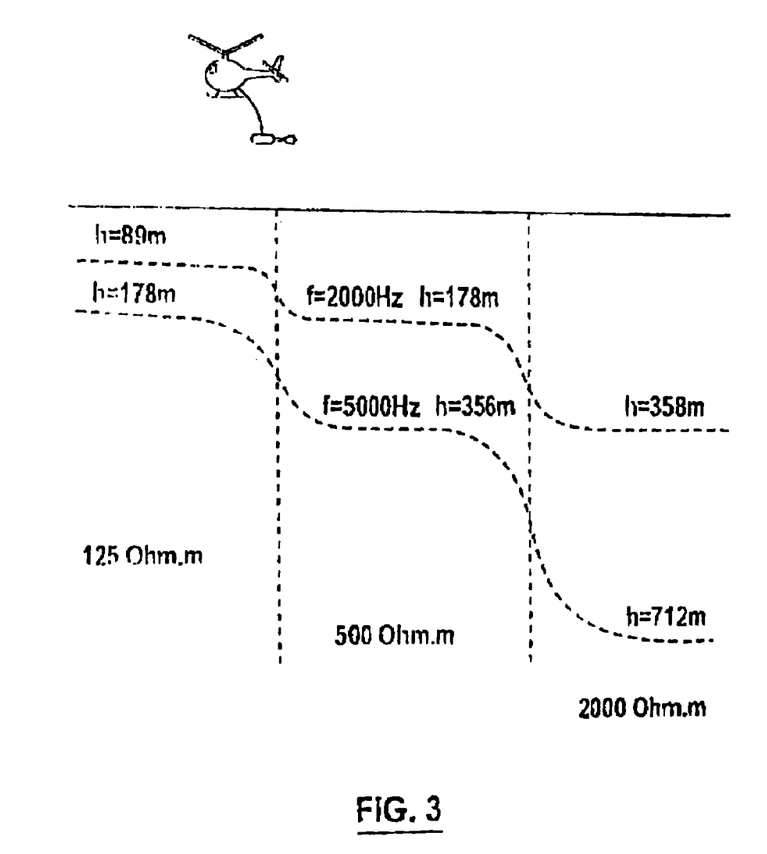
FIG. 3 illustrates the relationship between field penetration, ground electrical resistivity, and electromagnetic field frequency.

It is known that distortions to the natural electromagnetic fields caused by subsurface current patterns allow us to detect lateral conductivity variations. This is because these lateral conductivity variations give rise to vertical components of magnetic fields comprising the natural electromagnetic fields. As best shown in FIG. 3, generally the surface of the electromagnetic plane wave repeats for each frequency (with smoothing) with differing effective penetration depth for each frequency with depth increasing as the frequency is lowered. The measuring of the tilt angles of such electromagnetic waves permits the generation of survey data in that data regarding geological information such as ore bodies, oil deposits and the like beneath the surface of the Earth can be extrapolated from such tilt angles in a manner that is known.

Figure 1:
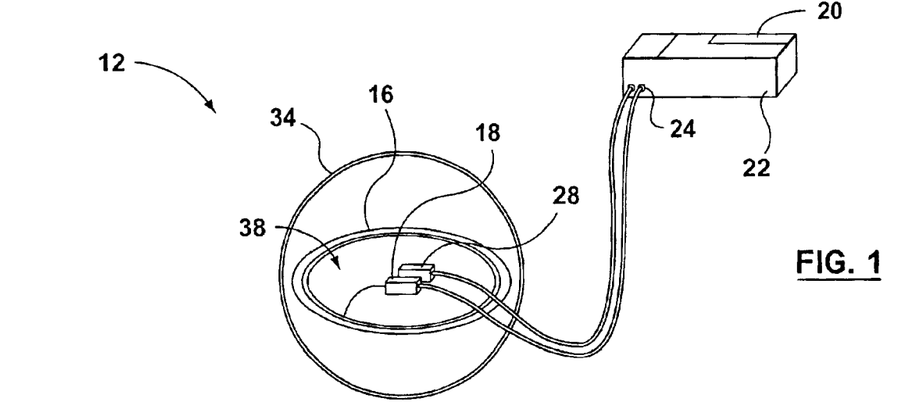
FIG. 1 illustrates the resources of the air assembly of the present invention.

The present invention includes an air assembly 12 that is illustrated in FIG. 1. The air assembly 12 is mounted on an aircraft or towed bird (as shown in FIG. 7) preferably in a manner that results in minimal electronic noise that would interfere with the sensors described below.

Figure 7:
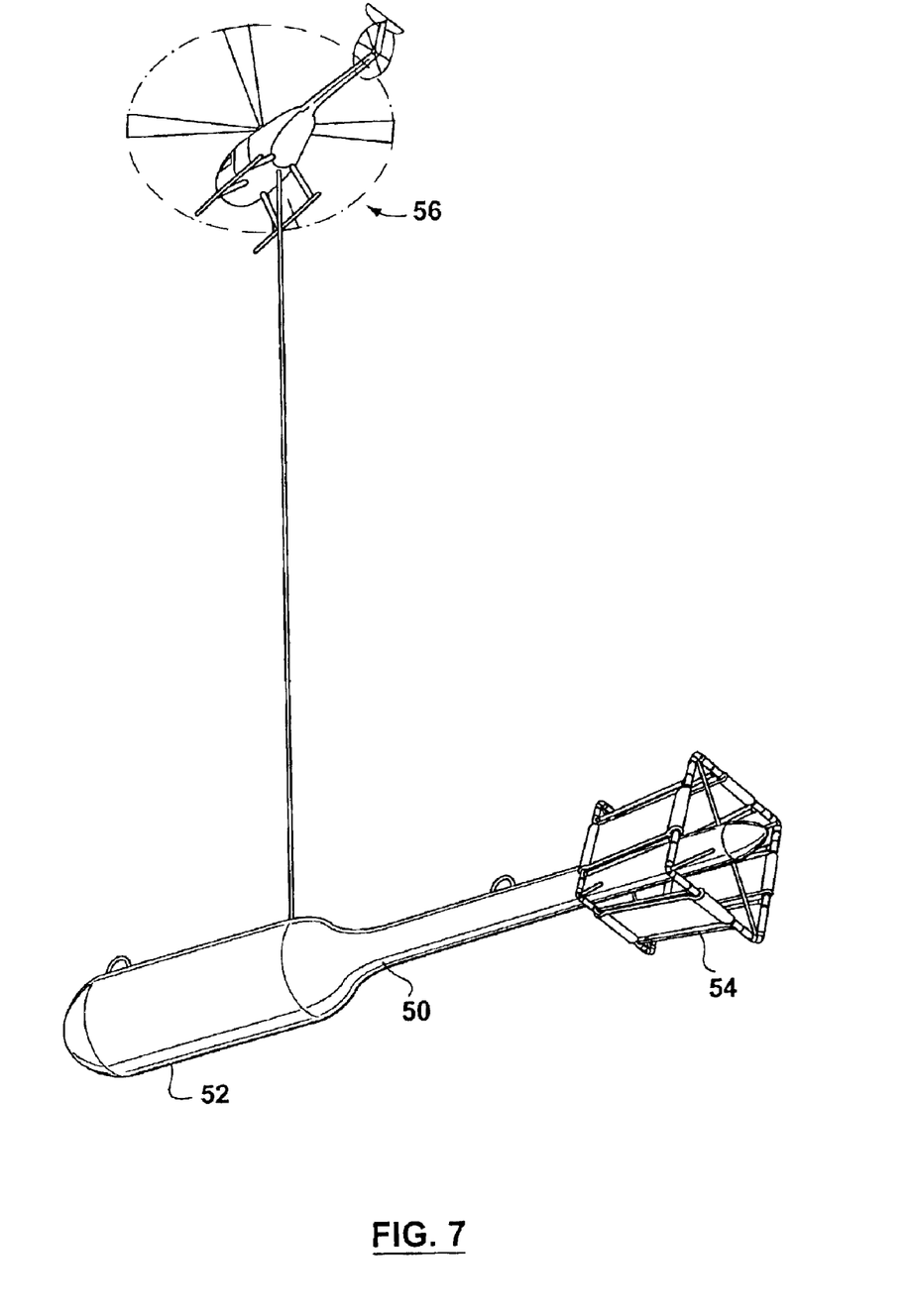
FIG. 7 illustrates in a perspective view the bird of the present invention that receives the air assembly, the bird being towed by a helicopter.
Figure 8:
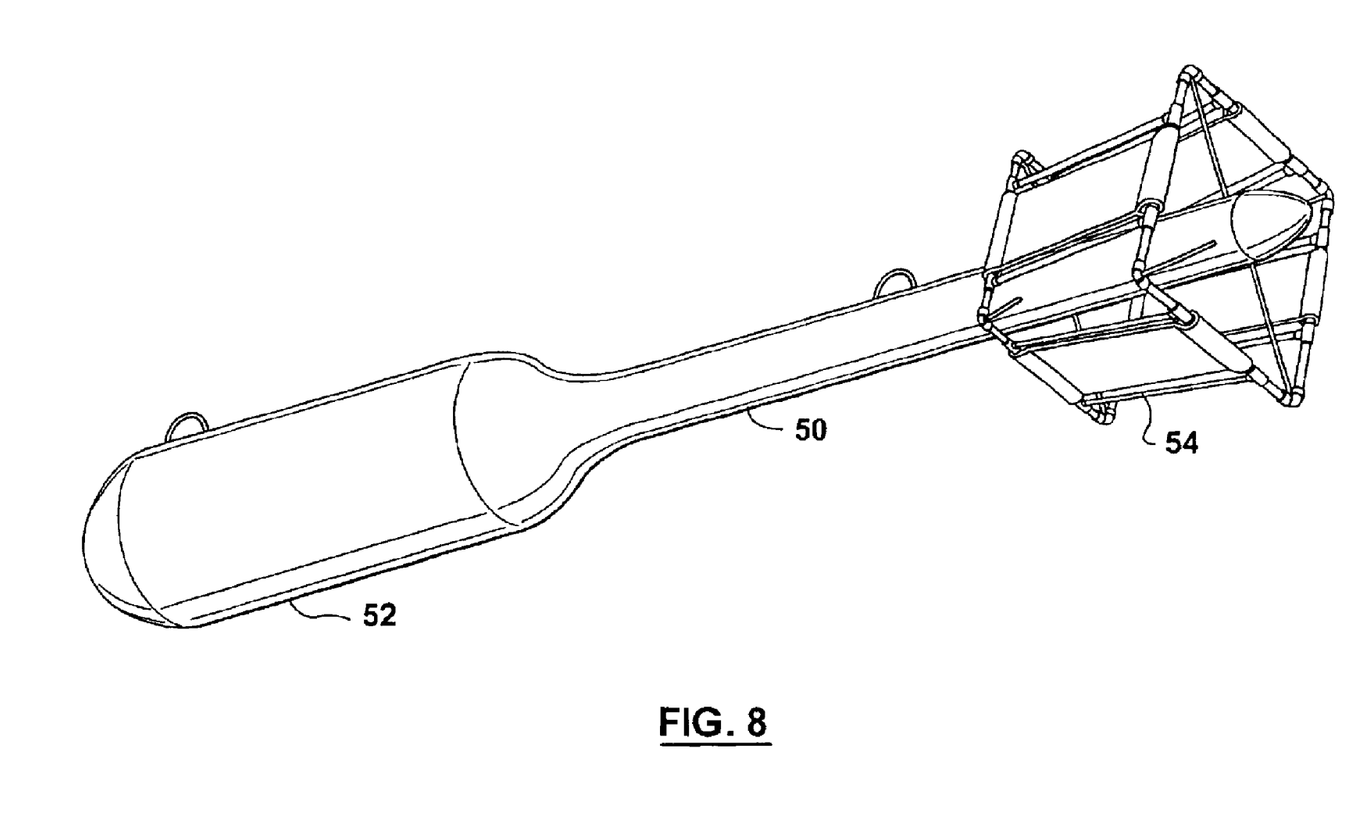
FIG. 8 illustrates in a perspective further illustrates the bird of the present invention.

In accordance with one embodiment of the present invention, the air assembly 12 is disposed within a bird 50, best shown in FIGS. 7 and 8. The bird 50 includes a hollow receptacle 52 for receiving the air assembly 12 of the present invention. The bird 50 has a generally longitudinal shape with aerodynamic shaping. At the follow end of the bird 50 a stabilizer 54 is provided to minimize spinning of the bird 50 during flight. The bird is towed behind an aircraft 56 of some sort that as shown in FIG. 7 is a helicopter.

The embodiment of the present invention shown in FIG. 8 is generally effective in applications where long distance flights for surveying purposes are not necessary. In other applications, particularly where survey flights require travel along relatively long distances and/or at relatively high speeds, use of an aircraft 56 that is an airplane is generally required. For safety and manoeuvrability reasons, towing the bird 50 behind an airplane (unless the airplane is a piston driven aircraft) is generally not desirable.

Figure 11:
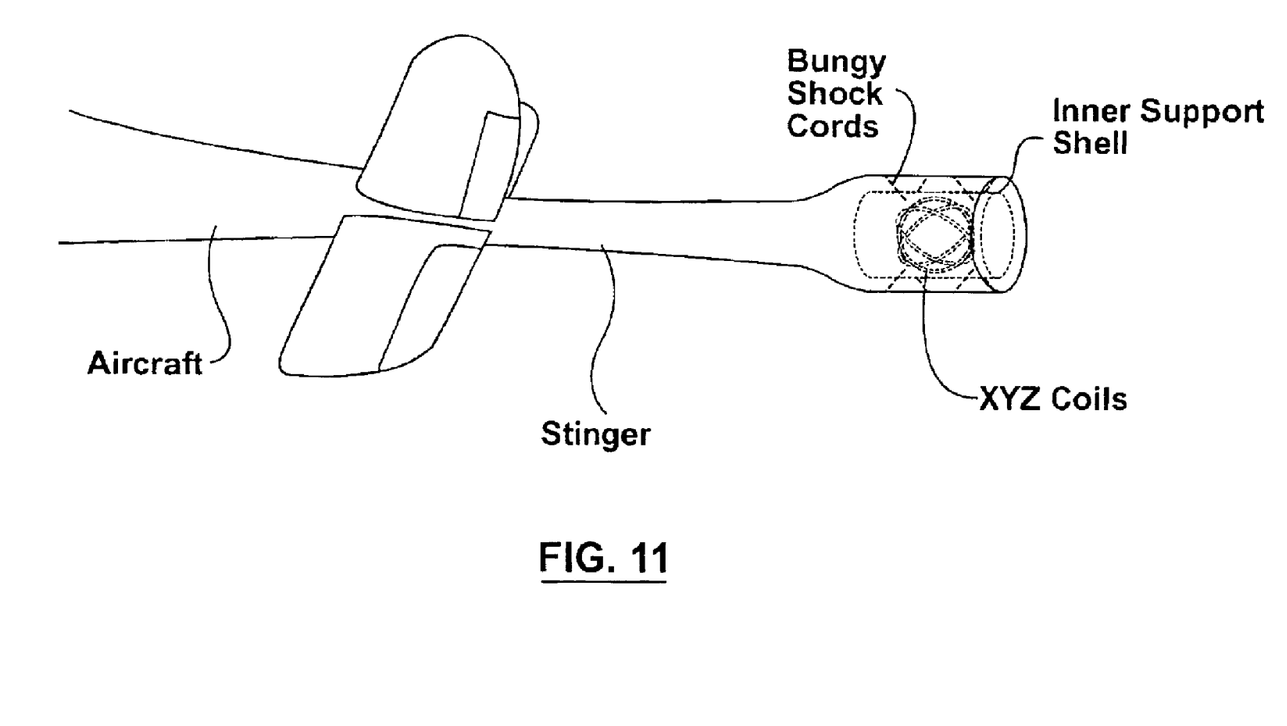
FIG. 11 illustrates the implementation of the present invention in the tail of an airplane in a broken away view.

For this reason, in another embodiment of the present invention, air assembly 12 is disposed in the tail or stinger section of an airplane, as shown in FIG. 11. The platform 38 of the present invention is disposed inside of an inner support shell inside the tail or stinger section. The tail or stinger section of an airplane is a desirable location because this area is generally remote from the part of the airplane that is the source of most electronic noise generated by an airplane, namely the front thereof. Also, in terms of minimizing electronic noise that generally interferes with the electromagnetic field signal, it has been found that it is generally desirable to use a turbine aircraft that does not use spark plugs and therefore generates less electronic noise.

There are some limitations to the disposition of the air assembly 12 in the stinger area of an aircraft. One such limitation is that depending on the specifications of the particular aircraft structure in question, there will generally be a maximum allowable weight that can be disposed inside the tube of the stinger. This means that in most applications, the weight of the air assembly 12 and therefore most notably the area and number of turns of coil included in the sensor of the present invention will have to be limited. This means that in most typical implementations of the air assembly 12 in the stinger of an aircraft, the present invention will generally be most suitable for detecting relatively high electromagnetic frequencies within the low frequency range.

In certain applications, for example, in oil exploration, detection of particularly low electromagnetic frequencies is desired, such as frequencies in the 1 Hz range, is desired. In these particular applications, a relatively greater sensor coil area (more turns, greater coil surface) will generally be required.

Figure 4:
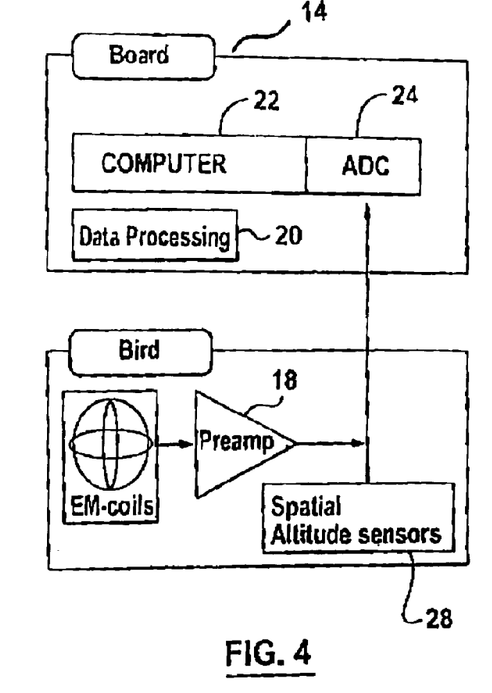
FIG. 4 illustrates the electronic components of the system of the present invention.
Figure 6:
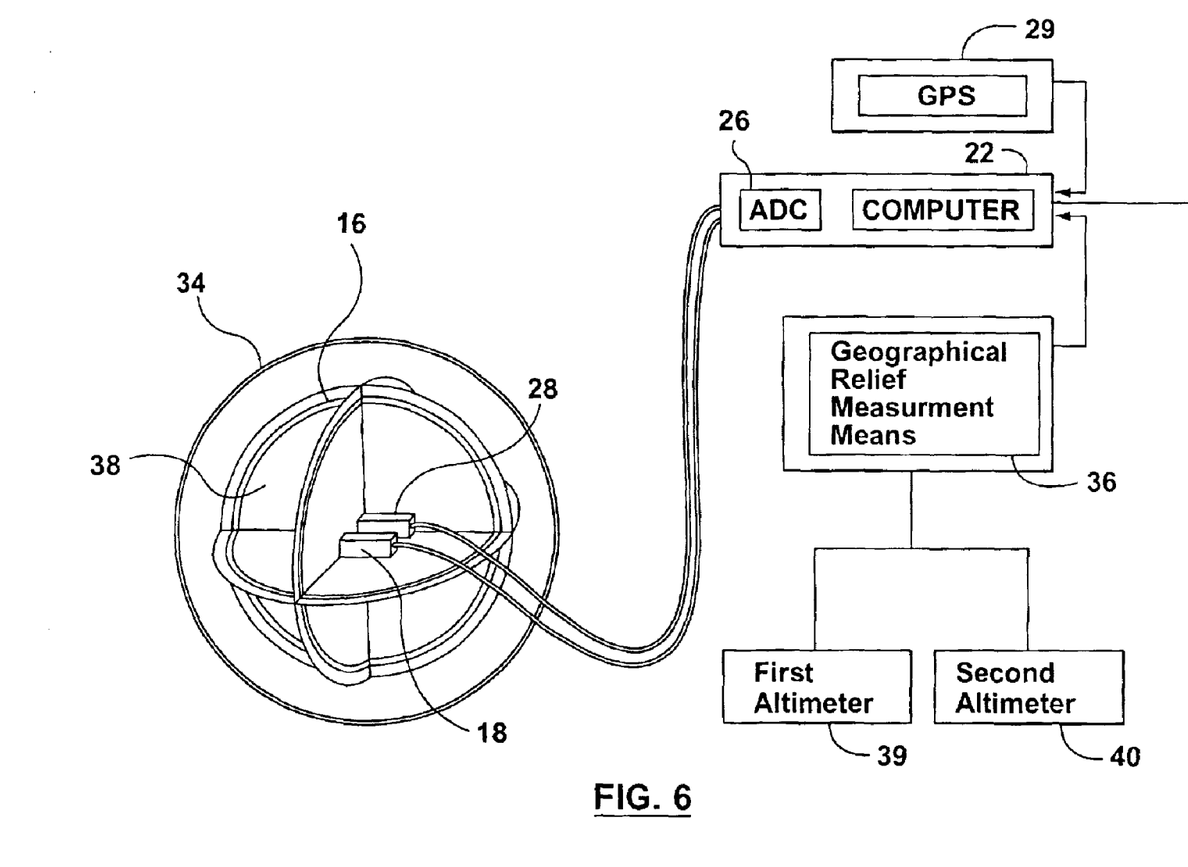
FIG. 6 further illustrates the components of the air assembly of the present invention and its connection to the further system components thereof.

As shown in FIGS. 1 and 6, the air assembly 12 comprises one or more electromagnetic sensors 16, low noise amplifiers or preamplifier 18. The air assembly is then connected to equipment that is generally disposed inside the aircraft. The on-board resources are illustrated by FIG. 4. On-board, a computer 22 is included. Computer 22 comprises an analog to digital converter device (ADC) 24 such that the output of the low noise amplifiers 18 is connected to an input of ADC 24, as shown in FIG. 6. The purpose of ADC 24 is to convert the analog data produced by sensors 16 into digital data for digital data conversion, as described below.

In an embodiment of the present invention, electromagnetic sensors 16 of air assembly 12 comprise electromagnetic sensor coils, provided in a manner that is well known. During testing, it was found that electromagnetic sensor coils having an area of 0.3 m$^2$ each achieved satisfactory results. The optimal number of turns in these coils depends on levels of voltage and current noise in the amplifiers used (as explained below). For example, when using LT1028 amplifiers, the turns used to obtain satisfactory results was approximately 200.

Low noise amplifiers 18 preferably comprise suitable wide-band amplifiers having a gain sufficient to keep thermal noise of electromagnetic sensors 16 on a level above the applicable noise level of ADC card 24. For example, in the case of 16-bit ADC card 24 with voltage range 10V, necessary gain must be at least 2000.

As particularised below, the function of electromagnetic sensors 16 is to collect data in regard to natural electromagnetic fields. These electromagnetic fields at certain frequency penetrate the ground at a given depth, as detailed above. This penetration depth depends on the electrical resistivity of the ground. The greater the electrical resistivity of the ground, the deeper the penetration of the electromagnetic field into the ground. The object of the present invention is to analyse electromagnetic penetration by measuring the tilt angles produced by the electromagnetic field, as described below.

Geological survey data useful in mineral and oil exploration can be extrapolated from such electromagnetic field penetration in a number of known ways. For example, in the specific context of oil exploration, the data related to electromagnetic field penetration permits research of indicators relevant to oil exploration including, shape of crystal basement, geological layers structure, facial resistivity changes in lateral direction in oil-containing layers, and facial resistivity changes in overburdening rocks.

Figure 2:
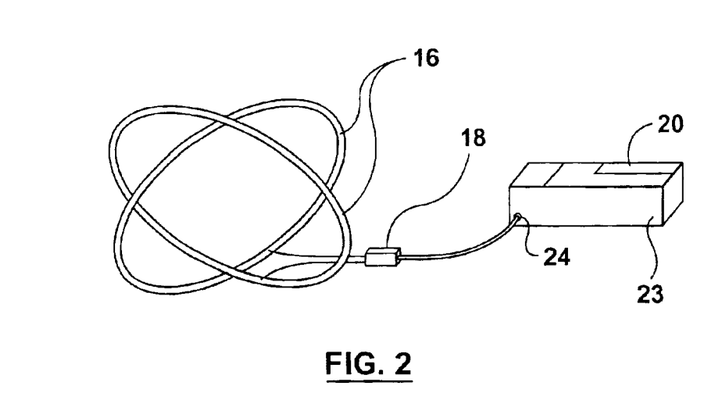
FIG. 2 illustrates the system resources of the ground assembly of the present invention, in an embodiment of the present invention.
Figure 9:
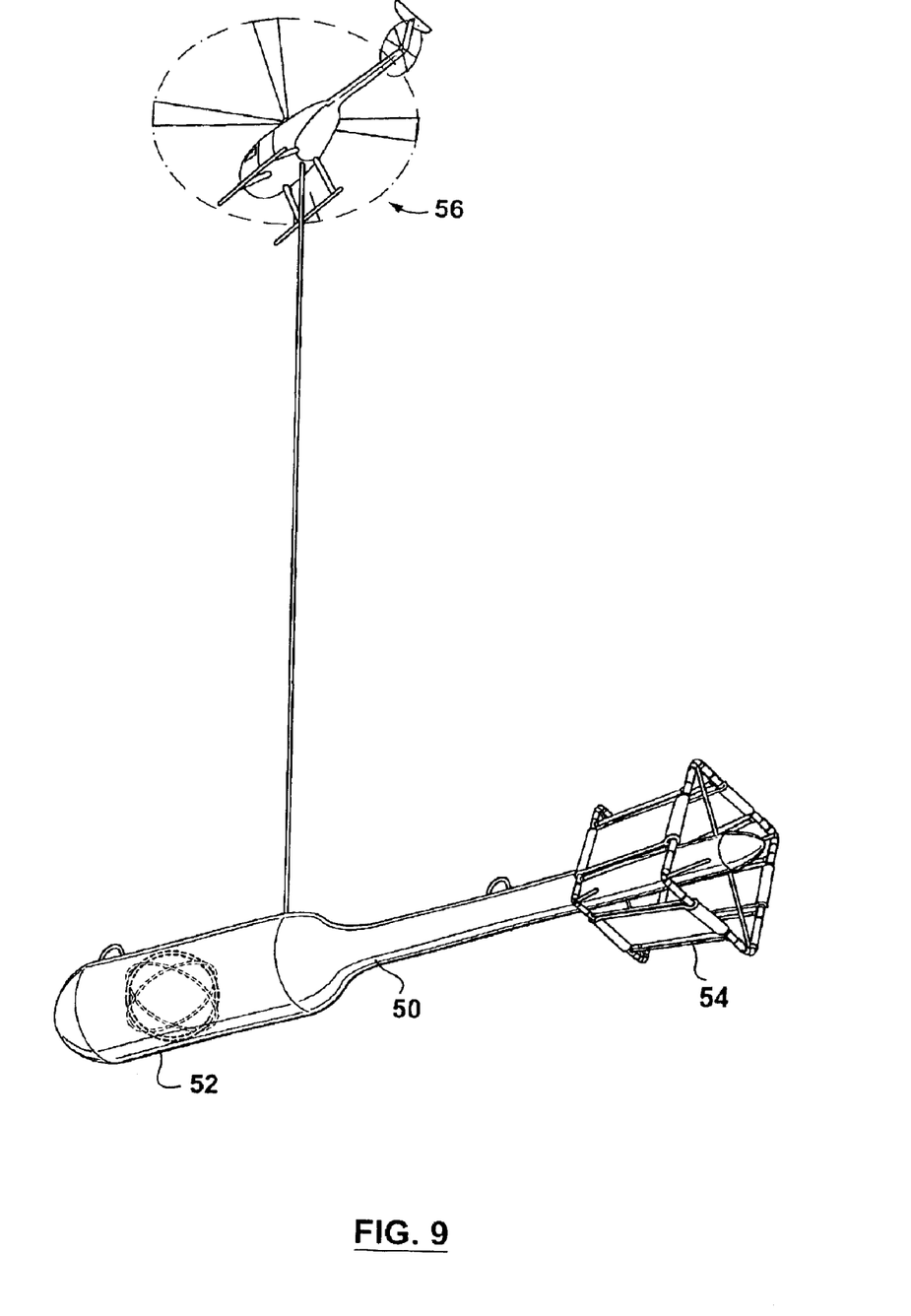
FIG. 9 illustrates in a broken-away view, the disposition of the air assembly within the bird of the present invention.
Figure 10:
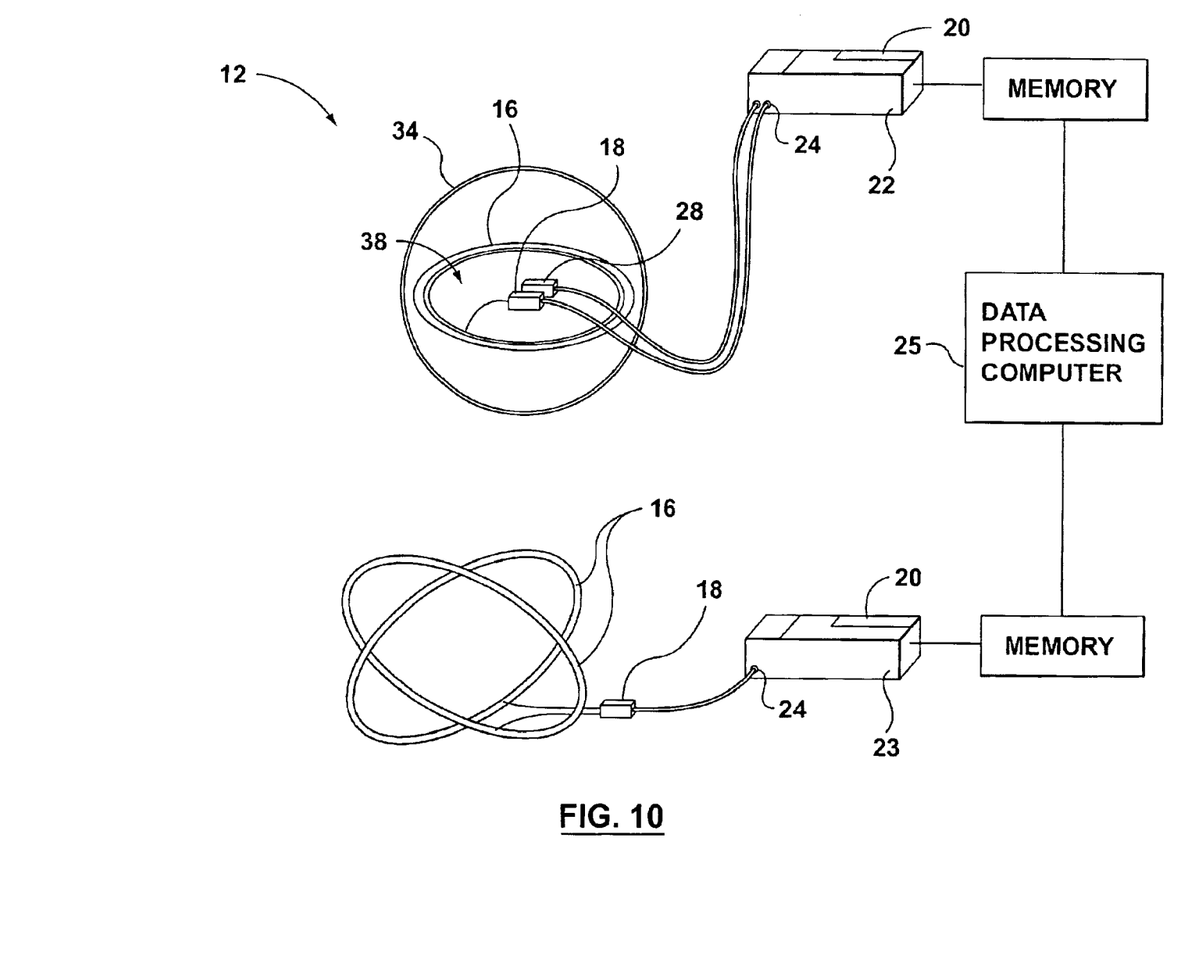
FIG. 10 is a system resource chart illustrating the resources of the second embodiment of the present invention.

The present invention further includes a data processing facility or data processing means 20, as shown in FIGS. 1, 2 and 6. Data processing means 20 is provided in association with a computer 22, 24 (depending on the particular embodiments discussed below) that is a standard computer, in a manner that is known. In a first embodiment of the present invention, the data processing means 20 is associated with first computer 22 provided at air assembly 12. It is also possible to simply store the various signal data to a memory (not shown) and then upload this data to a remote computer (not shown) that includes the data processing means 20. The remote computer in this embodiment of the present invention may constitute a survey data processing centre. In yet another embodiment of the present invention, as best shown in FIG. 9, the invention includes the air assembly 12 but also a ground assembly 14 (shown as "Board" in FIG. 4). In the particular implementation of this embodiment shown in FIG. 9, data is collected at each of the air assembly 12 and the ground assembly 14. Then, this data is passed on to the remote computer data processing centre 60.

In accordance with this second embodiment of the present invention, each of first computer 22, of air assembly 14, and second computer 24, of ground assembly 14, is associated with a memory (not shown) for storing data including survey data.

Alternatively, the present invention also contemplates that data is transferred from each of said first computer 22 and second computer 24 to the remote computer 60 by means of a suitable communication facility such as a wireless data network connection in a manner that is known. This particular implementation of the present invention facilitates real time processing of the survey data.

In accordance with the present invention, air assembly 12 also provides a spatial attitude detection facility or spatial attitude detection means 28 (shown in FIGS. 1 and 4). As is well known, the roll, pitch or yaw of air assembly 12 and particularly sensors 16 in flight can cause anomalies in measurement of the tilt angles produced by the electromagnetic fields by electromagnetic sensors 16. In this embodiment of the present invention, spatial attitude detection means 28 comprises known inclinometer devices provided in a manner that is well known for measuring the roll, pitch and yaw of the air assembly 12 and particularly sensors 16 during flight at any given moment. For example ADXL105 inclinometers can be used produced by Analog Devices Inc. In addition for yaw measurements, the air assembly may comprise a compass utilizing direction magnetic field vector. An example of a suitable compass is a Mag03MS magnetic compass produced by Bartington Instruments. As a still further alternative, other means for tracking the flight path of aircraft 56 can be used. This data relates to the spatial attitude of the sensor is preferably correlated with the geographical position. This is accomplished by further providing in the air assembly 12 a Global Positioning System ("GPS") 29 device (FIG. 6).

In either case, spatial attitude detection means 28 is adapted to provide data, as described above, to the computer 22 (and then to remote computer 60 in accordance with the embodiment of the invention where survey data processing occurs at the remote computer 60) regarding the spatial attitude of the air assembly 12 and particularly sensors 16 in relation to particular electromagnetic field readings provided by electromagnetic sensors 16. This is achieved by relating the electromagnetic field readings as well as the spatial attitude readings to a specific point in the local co-ordinate system of the airborne assembly 12. This data is in turn provided to data processing means 20 which is adapted to correct the measurements of the electromagnetic field tilt angles to reflect the movements of the air assembly 12 and particularly sensors 16 on one or more of its axes during flight.

The data processing means 20 correlates the electromagnetic field data obtained from sensors 16 (illustrated in FIG. 3) with the spatial attitude data of air assembly 12 in accordance with known mathematical formulae. This allows the creation of survey data wherein the data is adjusted based on variations of the spatial attitude of aircraft 56 during flight.

Figure 5:
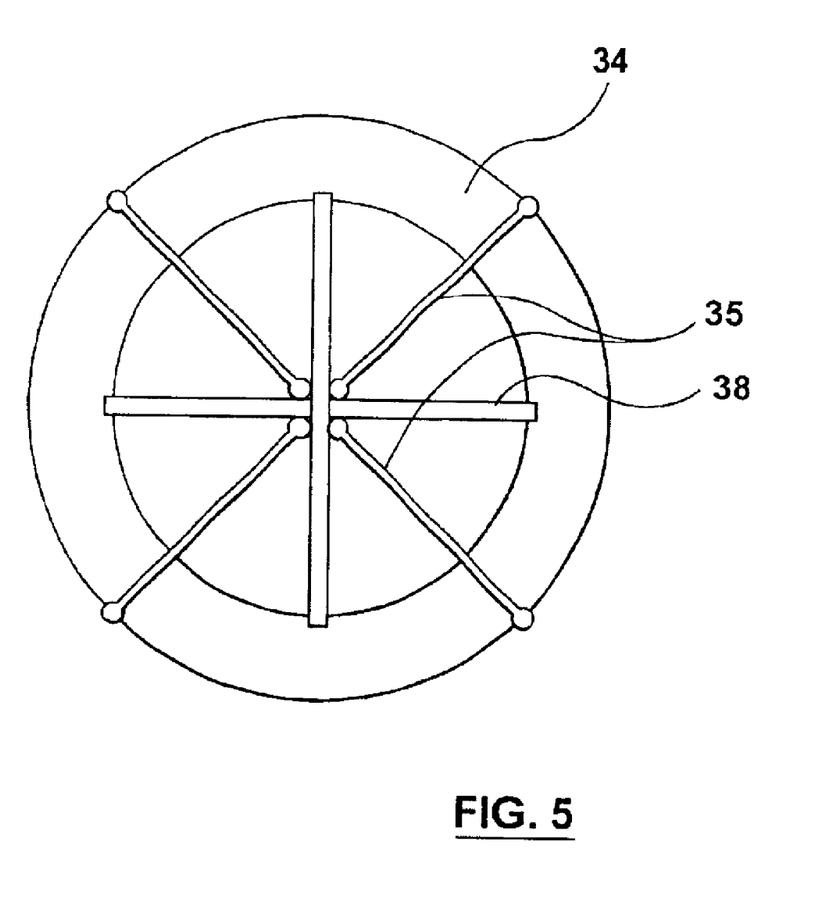
FIG. 5 illustrates the structure of the air assembly of the present invention including the casing or shell in a sectional view thereof.

As best illustrated in FIG. 1, air assembly 12, is provided in a casing 34. Casing 34 comprises electromagnetic sensors 16, amplifiers 18 as well as the spatial attitude detection means 28. Casing 34 is provided in a manner so as to protect air assembly 12 as much as is possible from vibrations and any resultant microphonic noise. The casing 34 includes a platform 38. As shown in FIG. 6, the sensor electronics including sensor coils 16 and preamplifier, and spatial attitude sensors 28 are disposed on the platform 38. As shown in FIG. 5, the platform 38 is then suspended so as to minimize vibration, for example, using bungee chords 35 or some other means of suspension as best shown in FIG. 5. To reduce acoustic vibrations, the sensitive coils assembly is surrounded by massive shell covered inside by acoustic noise absorber such as DYNALINER.

As stated earlier, another type of external noise can be electromagnetic noise from equipment in aircraft 56. In relation to electromagnetic noise that originates from the aircraft 56, the implementation of the present invention illustrated in FIG. 7 may be desirable whereby towing bird 50 permits distance to be created between the sensors 16 of the air assembly 12 and the aircraft noise sources.

It is generally desirable to further include in the system of the present invention a geographic relief measurement facility or geographic relief measurement means 36. This utility is generally included in the air assembly 12, as best shown in FIG. 6. In practice, as stated earlier, geographical relief distorts horizontal magnetic fields by producing false anomalies of tilt angles even where there are very homogeneous rocks beneath the ground surface. Therefore, particularly in a survey area that is not relatively flat, there is need for a geographic relief measurement means 36 for collecting data for post flight calculations of the tilt angles of geographical relief in the survey area. This data is synchronized with the measurement of the electromagnetic field intensity and provided to the remote computer 60 in the embodiment that includes such remote computer. Specifically, electromagnetic field readings and geographic relief data are also correlated in the local co-ordinate system of the airborne assembly 12, for example, by means of the GPS 29 shown in FIG. 6.

The geographic relief measurement means 36 of the present invention generally includes a first altimeter device 39 and a second altimeter device 40, as shown in FIG. 6. First altimeter device 39 is adapted to provide data regarding the absolute altitude of aircraft 56. In this particular embodiment of the present invention, the first altimeter device 39 is provided using this feature of the known GPS 29. Alternatively, the absolute altitude data can be collected using a barometric altimeter or the like. Second altimeter device 40 comprises a radar, or laser altimeter or the like for providing data regarding the relative altitude of the aircraft 56.

Data processing means 20 is adapted to process data provided by the first altimeter device 39 and the second altimeter device 40 so as to provide a local evaluation of the geographic relief of the survey area by comparing the relative altitude data and absolute altitude data in the local co-ordinate system of the survey area. Data processing means 20 is adapted to calculate the tilt angles of this geographic relief, in accordance with mathematical calculations generally provided to the remote computer 60 in a manner that is well known.

Data processing means (not shown) is then adapted to recalculate the electromagnetic field till angles based on the geographic relief of the survey area by a simple integration of tilt angle tangents in a manner that is well known.

In the second embodiment of the present invention referred to above, electromagnetic sensors 16 are divided between the air assembly 12 and a ground assembly 14. This particular construction of the present invention is advantageous where the external noise generated by aircraft 56 negatively affects the quality of the survey data, air turbulence is significant, or it is relatively impractical to suspend the air assembly 12 from the aircraft 56 at such a distance from the aircraft 56, such that a base value for the electromagnetic fields is required from a location that is unaffected by these factors. Similarly it may be also inconvenient or unsafe to provide the electromagnetic sensors 16 in the air assembly 12 having the desired field sensitivity due to the impact on the flight of the airplane of the weight of the electromagnetic sensors 16. In either case, the construction of the second embodiment of the present invention may be required.

Therefore in accordance with the second embodiment of the present invention, the ground assembly 14 is typically placed with a surface area on a stationary base point. As shown in FIG. 2, the ground assembly 14 comprises two or more electromagnetic sensors 16, low noise amplifiers 18 and a second computer 23. Computer 23 comprises an analog to digital converter device (ADC) 24 such that the output of the low noise amplifiers 18 is connected to an input of ADC 24. In a particular embodiment of this invention, ADC 24 is a standard ADC card such as a common 16-bit 100 kHz ADC card. Computer 23 comprises a standard CPU with microprocessor, provided in a manner that is known.

The use of air assembly 12 provides the advantage of collection of survey data on a relatively broad survey area, quickly and efficiently. However, while casing 34 of the air assembly 12 provides means for reducing the external noise referred to above, further means for minimising the impact of such noise on the electromagnetic survey data is required. Therefore, in accordance with the second embodiment of the present invention, said electromagnetic sensors 16 are divided between said air assembly 12 and said ground assembly 14 wherein the sensors 16 provided at said ground assembly 14 such that they are not impacted either by mechanical vibrations or electromagnetic noise of equipment in aircraft 56, and therefore the electromagnetic field measurement data collected by sensors 16 at the air assembly 12 are referenced to electromagnetic field measurement data collected by sensors 16 at the ground assembly 14 so as to reduce the impact of such external noise, in the manner described below. These sensors are referenced in time by the GPS 29 clock being recorded by each computer.

In the second embodiment of the present invention, air assembly 12 comprises an electromagnetic sensor 16 required to provide electromagnetic field measurements in the Z axis, whereas the ground assembly 14 comprises sensors 16 required to provide electromagnetic field measurements in the X and Y axes. The electromagnetic sensor 16 provided in the air assembly 12 in accordance with the second embodiment of the present invention can be provided by means of a single sensor coil in order to minimise the weight and size of the air assembly 12 in connection with an aircraft 56 that is an airplane.

It should be understood that alternate arrangements of electromagnetic sensors 16 as between the air assembly 12 and the ground assembly 14 are also possible. What is important is that such electromagnetic sensors 16 are provided in a manner that the data collected by the air assembly 12 is adapted to be referenced to the data collected by the ground assembly 14 so as to minimise the impact on the survey data generated by the present invention by the external noise referred to. It should be understood that in order to achieve this objective, depending on the electromagnetic sensitivity of the particular electromagnetic sensors 16 used at the air assembly 12 as well as the ground assembly 14, the data collected by the air assembly 12 may only be referenced within a specified distance of the ground assembly 14. In a particular implementation of the second embodiment of the present invention, it was found that using natural electromagnetic fields in frequency range from 1 Hz to 6 kHz for example, the acceptable range of air assembly 12 from ground assembly 14 in order to provide data having the referential value referred to herein, was approximately thirty to fifty kilometres. This distance can be made greater by reducing the upper frequency being measured.

As described above, data processing means 20 is adapted to calculate the electromagnetic field penetration based on the tilt angles of the electromagnetic field signals, as particularized below.

Natural electromagnetic fields are normally horizontally polarised. Subsurface lateral variations of conductivity generate a vertical component, which will be linearly related to the horizontal field. Although the fields look like random signal, they may be treated as the sum of electromagnetic wave sinusoids. At each frequency the field can be expressed as a complex number representing the amplitude and phase of the electromagnetic wave sinusoid. The relation between the field components can then be expressed by linear complex equation with two complex coefficients at any one frequency. These coefficients are dependent upon the subsurface, not upon the horizontal field present at any particular time and are therefore appropriate parameters to measure.

$$Z(f)=Tx(f)X(f)+Ty(f)Y(f)$$

Where:
  Z(f) is the vertical component of magnetic field
  X(f) and Y(f) are horizontal components of the field
  Tx(f) and Ty(f) are the "tipper" coefficients.
The real parts of the coefficients correspond to tilt angles measured with a controlled source. The complex tensor [Tx, Ty] known as the "tipper" defines the vertical response to horizontal fields in the X and Y directions respectively.

Tx and Ty are two unknown coefficients in one equation, and we therefore must combine at least two sets of measurements to solve them.

In accordance with the second embodiment of the present invention, wherein the electromagnetic sensor for measuring the electromagnetic field in the Z axis, in order to reduce effects of noise multiple, sets of measurements can be made, and the coefficients, which minimise the squared error in predicting the measured Z from X and Y can be found. This leads to these known formulas for estimating the coefficients.

$$Tx=([ZX^*][YY^*]-[ZY^*][YX^*])/([XX^*][YY^*]-[XY^*][YX^*])$$

$$Ty=([ZY^*][XX^*]-[ZX^*][XY^*])/([XX^*][YY^*]-[XY^*][YX^*])$$

Where:

[XY*] (for example) denotes a sum of the product of X with the complex conjugate of Y.

Unfortunately, the use of these equations has the effect that in weak electromagnetic field conditions where the level of the signal is comparable with noise level, the bias in estimated values of Tx and Ty caused by noise in the horizontal signals become substantial. As it is well know, this bias can be removed by the use of remote reference signals containing noise unrelated with noise in signals X and Y.

$$Tx=([ZRx^*][YRy^*]-[ZRy^*][YRx^*])/([XRx^*][YRy^*]-[XRy^*][YRx^*])$$

$$Ty=([ZRy^*][XRx^*]-[ZRx^*][XRy^*])/([XRx^*][YRy^*]-[XRy^*][YRx^*])$$

Where

Rx is the reference field x component,

Ry is the reference field y component.

This reference signal is produced by additional two coils having X and Y sensitivity axes. These additional coils can be allocated on the same ground assembly along with main X an Y coils in accordance with the second embodiment. To achieve useful effects they must be associated with the same natural field signals but without the correlated noise. In case of ground assembly measurements that are thermal noise only, these cannot be correlated. Using such coils in flight assembly as in the first and second embodiments to reduce vibrating and electromagnetic noise does not make any sense because these noises are correlated and can not be reduced in this way.

The result of the application of the above formulas is that the natural electromagnetic field penetration is expressed in three axes, but such that the field penetration data is referenced as collected from the air assembly 12 with the data as collected from the ground assembly 14. This has the effect of improving the signal to noise ratio and therefore improves the geological value of the survey data collected.

Other variations and modifications of the invention are possible. All such modifications or variations are believed to be within the sphere and scope of the invention as defined by the claims appended hereto. For example, air assembly 12 can be disposed inside the aircraft 56, preferably on a known stable platform (that generally includes a series of gyrostabilizers). The stable platform permits generation of survey data at lower frequencies because of less data corrections to respond to small direction changes of the aircraft. It should also be understood that other electronics that those specifically described can be used to measure the electromagnetic waves of the natural EM fields in accordance with the present invention.

We claim:

1. A method of data acquisition for geophysical surveys, comprising the steps of:
    (a) Providing in a survey area a sensor unit that includes an airborne sensor unit for measuring low frequency natural electromagnetic fields;
    (b) Calculating one or more tilt angles of the electromagnetic waves of the low frequency natural electromagnetic fields;
    (c) Extrapolating geophysical data from the tilt angles using a data processing facility; and
    (d) Calibrating the geophysical data to reduce fluctuations to the tilt angles caused by movement of the airborne sensor unit.

2. A method of data acquisition for geophysical surveys, comprising the steps of:
    (a) Flying an airborne sensor unit for measuring low frequency natural electromagnetic fields in a survey area:
    (b) Calculating one or more tilt angles of the electromagnetic waves of the low frequency natural electromagnetic field;
    (c) Extrapolating geophysical data from the tilt angles using a data processing facility; and
    (d) Calibration the geophysical data to reduce fluctuations to the tilt angles caused by movement of the airborne sensor unit.

3. The method of data acquisition for geophysical surveys claimed in claim 2, comprising the further steps of:
    (a) Measuring the spatial attitude of the airborne sensor unit in the survey area using a spatial attitude detection facility; and
    (b) Calibrating the geophysical data to exclude fluctuations to the tilt angles caused by movements of the airborne sensor unit based on one or more spatial attitudes measured for the airborne sensor unit.

4. The method of data acquisition for geophysical surveys claimed in claim 2, comprising the further step of:
    (a) Measuring data regarding the geographical position in the survey area of the airborne sensor unit; and
    (b) Correlating the geophysical data with the data regarding at least one geographic position of the airborne sensor to produce geographic location specific geophysical data, using the data processing facility.

5. A method of data acquisition for geophysical surveys, comprising the steps of:
    (a) Flying an airborne sensor unit for measuring low frequency natural electromagnetic fields in a survey area for the Z axis;
    (b) Providing a ground based sensor unit for measuring low frequency natural electromagnetic fields in the survey area for the X and Y axis;
    (c) Calculating one or more tilt angles of the electromagnetic waves of such low frequency natural electromagnetic fields; and
    (d) Correlating the electromagnetic field data from the airborne sensor unit for the Z axis with the electromagnetic field data from the ground based unit for the X and Y axis to produce geophysical data at a low frequency using a data processing facility.

6. A geophysical survey system for generating geophysical survey data regarding a survey area, comprising:
    (a) At least one airborne sensor unit for measuring low frequency natural electromagnetic fields in the survey area; and
    (b) A computer linked to a data processing application for:
        (i) Receiving data from the sensor unit and calculating the tilt angles of the electromagnetic waves of the low frequency natural electromagnetic fields in the survey area;

(ii) Extrapolating geophysical data from the tilt angles using a data processing facility; and (iii) Calibrating the geophysical data to reduce fluctuations to the tilt angles caused by movement of the airborne sensor unit.

7. A geophysical survey system as claimed in claim 6, further comprising a spatial attitude detection facility functionally linked with the computer whereby the data processing application for calibrating the tilt angles to exclude fluctuations of the tilt angles caused by movement of the airborne sensor unit based on one or more spatial attitudes of the airborne sensor unit detected by the spatial attitude detection facility.

8. A geophysical survey system as claimed in claim 7, further comprising a geographic locator facility functionally linked with the computer whereby the data processing application correlates the geophysical data with data regarding one or more geographic positions of he airborne sensor unit to produce geographic location specific geophysical data.

9. A geophysical survey system as claimed in claim 6, further comprising a ground based sensor unit for measuring low frequency natural electromagnetic fields in the survey area wherein the data processing application correlates the electromagnetic field data from the airborne sensor unit with the electromagnetic field data from the ground based unit to produce the geophysical data.

10. A geophysical survey system as claimed in claim 6, wherein the system further comprises a noise reduction means.

11. A geophysical survey system as claimed in claim 10, wherein the noise reduction means includes a bird that is connected to an aircraft, wherein the distance between the bird and the aircraft is selected to substantially reduce the impact of electronic noise from the aircraft on the geophysical data.

12. A geophysical survey system as claimed in claim 10, wherein the noise reduction means includes a shell comprised of noise absorbing material that surrounds the airborne sensor unit.

13. A geophysical survey system as claimed in claim 6, wherein the airborne sensor unit further includes a geographic relief measurement facility that measures and collects data regarding the geographic relief of the survey area, and wherein the computer correlates the geophysical data with the geographic relief data to minimize the impact of electromagnetic tilt angle anomalies caused by the geographic relief of the survey area.

14. A geophysical survey system comprising:

(a) An airborne sensor unit for measuring low frequency natural electromagnetic fields in a survey area for the Z axis;

(b) A ground based sensor unit for measuring low frequency natural electromagnetic fields in the survey area for the X and Y axes;

(c) A computer functionally linked with a data processing application, the computer being in communication with the airborne sensor unit and ground based sensor unit, the computer correlating the tilt angles of the natural electromagnetic field measured by each of the airborne sensor unit for the Z axis and the ground based sensor unit for the X and Y axes to produce geophysical data for the survey area, the computer also calibrating the geophysical data to reduce fluctuations to the tilt angles caused by movement of the airborne sensor unit.

15. A geophysical survey system as claimed in claim 14, wherein the data processing application correlates the electromagnetic field data from the airborne sensor unit with the electromagnetic field data from the ground based sensor unit to filter out electronic noise from the geophysical data.

16. A computer program on a computer readable medium loaded on a computer, the computer program including computer implemented steps for:

(a) Extrapolating geophysical data for distortions to the tilt angles caused by movement of a sensor unit by correlating data regarding the movement of the sensor unit with electromagnetic wave data;

(b) Calibrating the geophysical data for distortions to the tilt angles caused by movement of a sensor unit by correlating data regarding the movement of the sensor unit with electromagnetic wave data;

(c) Correlating the geophysical data with geographic relief data to exclude tilt angle anomalies caused by geographic relief in the survey area; and (d) Correlating the geophysical data with data regarding the geographic position of the sensor unit to produce location specific geophysical data.

17. A method of data acquisition for geological surveys using relatively low frequencies comprising the steps of:

(a) Extrapolating geophysical data for a survey area from tilt angles of electromagnetic waves;

(b) Calibrating the geophysical data for distortions to the tilt angles caused by movement of a sensor unit by correlating data regarding the movement of the sensor unit with electromagnetic wave data;

(c) Correlating the geophysical data with geographic relief data to exclude tilt angle anomalies caused by geographic relief in the survey area; and (d) Correlating the geophysical data with data regarding the geographic position of the sensor unit to produce location specific geophysical data.

* * * * *